(12) United States Patent
Ahire et al.

(10) Patent No.: US 8,957,327 B2
(45) Date of Patent: Feb. 17, 2015

(54) FEED-THROUGH ASSEMBLY

(71) Applicant: General Electric Company, Schenectady, NY (US)

(72) Inventors: Rakesh Girdhar Ahire, Bangalore (IN); Sharmila Banagahallyhuchaiah, Bangalore (IN); Prabu Sampath, Bangalore (IN)

(73) Assignee: General Electric Company, Schenectady, NY (US)

( * ) Notice: Subject to any disclaimer, the term of this patent is extended or adjusted under 35 U.S.C. 154(b) by 73 days.

(21) Appl. No.: 13/630,503

(22) Filed: Sep. 28, 2012

(65) Prior Publication Data
US 2013/0081873 A1 Apr. 4, 2013

(51) Int. Cl.
*B23K 31/02* (2006.01)
*B23K 1/19* (2006.01)
*H01J 5/34* (2006.01)
*H01J 5/46* (2006.01)
*H01J 9/32* (2006.01)
*H01J 35/16* (2006.01)
*B23K 1/00* (2006.01)

(52) U.S. Cl.
CPC ... *B23K 1/19* (2013.01); *H01J 5/34* (2013.01); *H01J 5/46* (2013.01); *H01J 9/32* (2013.01); *H01J 35/165* (2013.01); *B23K 1/0016* (2013.01); *B23K 2201/36* (2013.01); *B23K 2203/02* (2013.01); *B23K 2203/08* (2013.01); *B23K 2203/18* (2013.01)

USPC ............ 174/650; 174/652; 174/659; 361/302

(58) Field of Classification Search
USPC ........................... 174/650, 652, 659; 361/302
See application file for complete search history.

(56) References Cited

U.S. PATENT DOCUMENTS

| | | | |
|---|---|---|---|
| 3,594,895 A | 7/1971 | Hill | |
| 4,336,416 A * | 6/1982 | Goodsell | 174/483 |
| 5,032,690 A * | 7/1991 | Bloom | 174/487 |
| 6,521,350 B2 | 2/2003 | Fey et al. | |
| 6,986,453 B2 | 1/2006 | Jiang et al. | |
| 8,525,047 B2 * | 9/2013 | Guntermann et al. | 174/652 |

* cited by examiner

*Primary Examiner* — Dhirubhai R Patel
(74) *Attorney, Agent, or Firm* — GE Global Patent Operation; Mark A. Conklin

(57) ABSTRACT

A feed through assembly has a metal component passed through a ceramic insulator, and a multi-layered joint brazed to the ceramic insulator and the metal component to form the assembly. The multi-layered joint includes a first portion of braze filler material placed around the metal component and a hollow member of predetermined shape placed around the metal component. A flange is provided at a first end of the hollow member, wherein the flange rests on the first portion of braze filler material. The multi-layered joint has a second portion of braze filler material placed around the hollow member and seated onto the flange. A ceramic member of predetermined shape is placed around the hollow member which rests on the second portion of braze filler material. A third portion of braze filler material is placed around the metal component and seated onto a second end of the hollow member.

11 Claims, 3 Drawing Sheets

FEED-THROUGH ASSEMBLY

CROSS-REFERENCE TO RELATED APPLICATIONS

This application claims foreign priority benefits under 35 U.S.C. §119 to co-pending Indian Patent Application Serial No. 3403/CHE/2011, filed Sep. 30, 2011, which is hereby incorporated by reference in its entirety as part of the present disclosure.

BACKGROUND OF THE INVENTION

The subject matter disclosed herein relates to a method of producing feed-through assembly using ceramic to metal bonding used in devices such as an X-ray tube. The method is more particularly related to metal-ceramic brazing with appropriate braze materials.

Metal-ceramic brazing involves the use of interlayer materials which either melt at the bonding temperature, such as a braze, or which involve special coating processes for the material surfaces to be bonded.

Metal-ceramic joints find huge potential applications in engineering structures. Due to the thermal expansion occurring between the metal and ceramic joints, these joints are prone to failures or inconsistent performance. Also, brazing processes introduce a lot of residual stresses due to the effect of immediate cooling from the braze temperature. These residual stresses remain even after the original cause of the stresses leading to breakage in the joints causing failure with prolonged use.

Ceramics are inherently difficult to join either to themselves or metal structures because of their strong ionic and covalent bonding. However, there are several well-established technologies available, including mechanical attachment, adhesives, soldering/brazing and glass-metal sealing. These are often chosen on the basis of temperature requirement of the joint, ease of implementation, functionality etc. There are also other more unusual or application-specific processes, such as microwave bonding, ultrasonic welding and friction welding. Of the many joining processes available, probably the main and most adaptable technique used to join ceramics is brazing.

Ceramic brazing is a liquid phase process that is particularly well suited to preparing joints and seals, and is an established technique for the joining of ceramics. The brazing process involves the joining of two pieces of metal by a fusing layer of brass or spelter between the adjoining surfaces. Here the braze melts and flows in between two materials.

Normally, when a braze alloy or metal is melted between two ceramics a poor joint is likely to form, because of poor wetting. Wetting is a process of obtaining good adhering properties between materials to be brazed. To obtain good wetting properties from the metal surface, the surface of the ceramics or metal is coated with a thin film of metal coating or metal hydride treatment. This helps the braze material to wet or adhere to the surface of the metal/ceramic. Also in a few cases surface treatments like metallization are carried out to obtain good wetting properties.

Filler metal is heated above its melting temperature and distributed between two or more close-fitting parts. The molten metal flows and fills in the gaps by capillary action and is allowed to cool to form a brazed joint. The disadvantage of conventional brazing is the formation of residual stresses developed between the joints during the cooling process. Further the conventional brazing technique has the following drawbacks such as lack of fill, flux entrapment, improper wetting, discontinuous fillet and base metal erosion. In addition, when using conventional brazing, it is difficult to form a leak proof joint between the vacuum chamber and atmospheric chamber.

Hence there exists a need to provide a leak proof joint between the vacuum chamber and the atmospheric chamber of a medical device and producing minimal residual stresses.

BRIEF DESCRIPTION OF THE INVENTION

The shortcomings of the prior art are overcome and additional advantages are provided through the provision of a system and method as claimed in the present disclosure.

Additional features and advantages are realized through the techniques of the present disclosure. Other embodiments and aspects of the disclosure are described in detail herein and are considered a part of the claimed disclosure.

In an embodiment of the disclosure, a feed through assembly is provided. The feed through assembly comprises a metal component passed through a ceramic insulator, and a multilayered joint brazed to the ceramic insulator and the metal component to form a feed-through assembly. The multi-layered joint comprises a first portion of braze filler material placed around the metal component and a hollow member of predetermined shape placed around the metal component, the hollow member comprising a flange at a first end, wherein the flange rests on the first portion of braze filler material. The feed through assembly further comprises a second portion of braze filler material placed around the hollow member and seated onto the flange, a ceramic member of predetermined shape placed around the hollow member which rests on the second portion of braze filler material, and a third portion of braze filler material placed around the metal component and seated onto a second end of the hollow member to form a multi-layered joint.

In an embodiment of the disclosure, a method of forming a brazed joint between a ceramic insulator and a metal component is provided. The method comprises passing the metal component through the ceramic insulator, forming a multilayered joint, and subjecting the multi-layered joint to a predetermined number of brazing temperature cycles to form the brazed joint between the ceramic insulator and the metal component. The step of forming the multi-layered joint comprises placing a first portion of braze filler material around the metal component to rest on the ceramic insulator, inserting a hollow member having a flange at a first end over the first portion of braze filler material, wherein the flange seats onto the first portion of braze filler material, and placing a second portion of braze filler material around the hollow member, wherein the second portion of braze filler material rests on the flange of the hollow member. Further, the step of forming the multi-layered joint comprises inserting a ceramic member around the hollow member, wherein the ceramic member rests on the second portion of braze filler material, and inserting a third portion of braze filler material around the metal component, such that the third portion of braze filler material rests on a second end of the hollow member to form the multi-layered joint.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The novel features and characteristic of the disclosure are set forth in the appended claims. The disclosure itself, however, as well as a preferred mode of use, further objectives and advantages thereof, will best be understood by reference to the following detailed description of an illustrative aspect when read in conjunction with the accompanying figures. One or more aspects are now described, by way of example only, with reference to the accompanying figures wherein like reference numerals represent like elements and in which:

DETAILED DESCRIPTION OF THE INVENTION

The foregoing has broadly outlined the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific aspect disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

Figure 1:
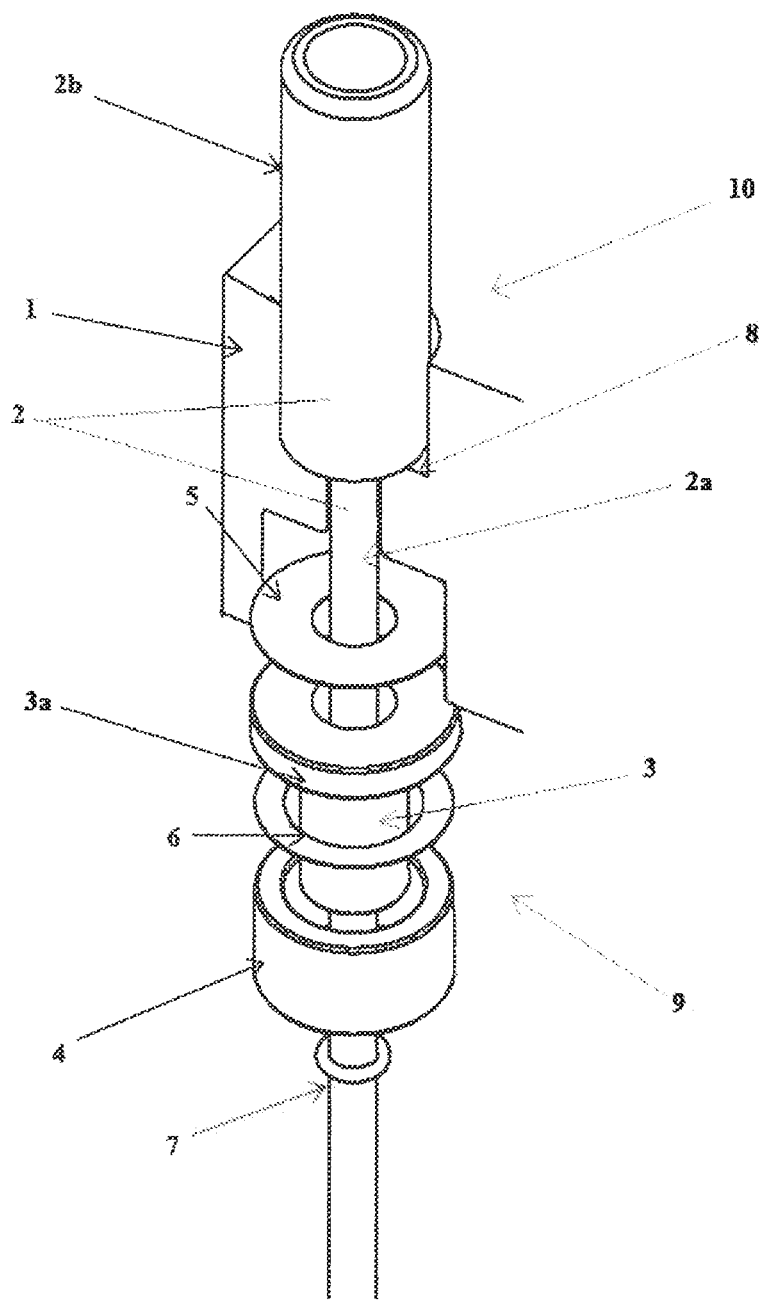
FIG. 1 illustrates a cut view of feed through assembly with cavity according to an embodiment of the invention.

FIG. 1 shows an exemplary embodiment which illustrates a sectional view of a feed through assembly. The feed through assembly comprises a ceramic insulator (1) for providing high voltage insulation against the passing electric current. A metal component (2) is passed through the ceramic insulator (1). In one embodiment, the metal component (2) material is selected from a group comprising Nickel and Fe—Ni alloy having a chemical composition of 29% Nickel, 17% Cobalt, 53.58% (Balance) Iron, 0.10% Silicon, 0.30% Manganese and 0.02% Carbon. The metal component (2) has two parts. One is a pin (2a) at one end and the other is a hollow metal portion (2b) on the other end. The pin (2a) extends above the ceramic insulator (1) into a vacuum chamber (9) and the hollow metal portion (2b) protrudes into an atmospheric chamber (10). A cavity (8) is provided in the vacuum chamber (9) to house the multi layered joint. A first portion of braze filler material (5) is placed around the pin (2a) which rests at the bottom of the cavity (8). A hollow member (3) having a flange (3a) at one end forms a hat shaped structure and is placed over the first portion of braze filler material (5) wherein the flange (3a) rests on the first portion of braze filler material (5). A second portion of braze filler material (6) is placed around the hollow member (3) and is seated onto the flange (3a) of the hollow member (3). A ceramic member (4) of predetermined shape is placed around the hollow member (3) which rests on the second portion of the braze filler material (6). A third portion of braze filler material (7) is placed around the pin (2a) of the metal component (2) and seats onto the top surface of the hollow member (3) forming a multi layered joint.

The multi layered joint can be formed around the pin (2a) of the metal component (2) outside the cavity (8). The multi layered joint is then held together and pushed into the cavity (8) to form a brazed joint between the ceramic insulator (1) and metal component (2). The multi layered joint is subjected to brazing process temperatures. Thermal expansions takes place between the metal component materials and braze filler materials and a joint is formed. The intermediate metal selected here is Fe—Ni alloy having the following chemical composition: 29% Nickel, 17% Cobalt, 53.58% (Balance) Iron, 0.10% Silicon, 0.30% Manganese and 0.02% Carbon. Co-efficient of expansion of Fe—Ni alloy is similar to that of the ceramic material and hence it limits the damage due to residual stresses. The Fe—Ni alloy surface is electroplated with nickel. Nickel plating on Fe—Ni alloy enhances bonding and also avoids any heavy metal penetration like silver present in the Copper Silver (CuSil) braze material. The Braze filler materials used here are Copper Silver (CuSil) having a chemical composition of 72% Silver and 28% Copper and Oxygen-free High Thermal Conductivity Copper (OHFC).

The ceramic part used here is Alumina Ceramics with a minimum 94% of Alumina ($Al_2O_3$). The joining surfaces are metalized for proper wettability with moly manganese with a coat thickness ranging from about 13 to about 40 micron and dull Nickel-plated having a coat thickness ranging from about 3 to about 12 micron thick. Metallization is highly suitable for high vacuum application.

The first, second and third braze portion of braze filler materials (5, 6, 7) are subjected to high temperatures during a brazing process and the braze filler materials melt and fill in the gaps between the multi layered joint due to capillary action. The braze gap between pin (2a) outer diameter and hollow member (3) inner diameter is in the range of 40 to 70 Microns. The braze joint hence formed is a leak proof joint having a leak rate of $<3\times10^{-9}$-mbar lit./sec. After a number of thermal cycles the leak proof joint becomes a good component for devices like an X-ray tube which satisfies the commercial advantage. Apart from braze washers (5, 6, 7) as filler materials, different forms of braze fillers can be used to form a brazed joint. The other braze filler materials that can be used are a paste form of braze filler material, ring-shaped foils etc. The braze joint thus formed can withstand a minimum of 10 thermal cycles and temperature ranges of about room temperature to about 550° C.

The design of the hat shaped structure helps neutralize the residual stresses developed during brazing operation. The residual stresses developed are shared between the ceramic member (4) and the ceramic insulator (1). A third portion of braze filler material (7) is seated at the top surface of the hollow member (3) and is brazed to the pin (2a) of the metal component (2) which provides a degree of flexibility for the joint to adjust for the stresses developed during brazing operation. The brazed joint offers deflection angle ranging from about 0.5° from its axis. This causes the residual stresses to fade away and the brazed joints can withstand high vacuum even after a number of thermal cycle temperature changes from room temperature to 550° C.

Figure 2:
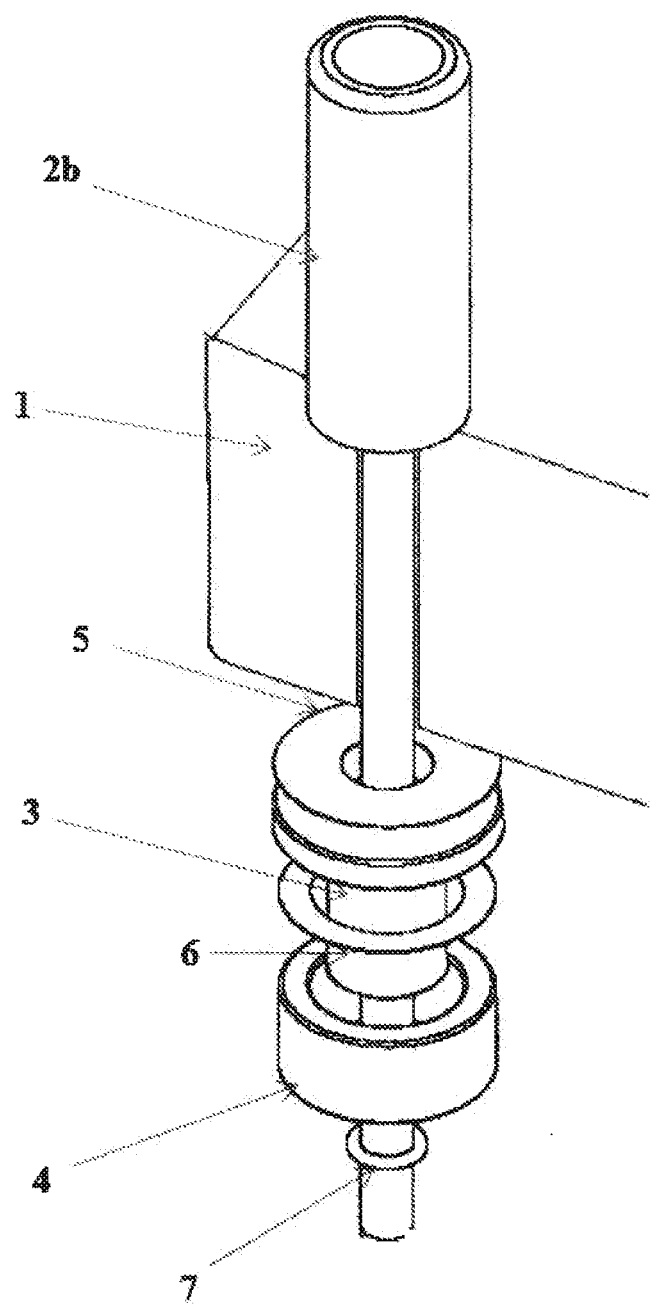
FIG. 2 illustrates a cut view of feed through assembly without cavity according to an embodiment of the invention.

FIG. 2 is an exemplary embodiment which illustrates a sectional view of the assembled feed through assembly. The first portion of braze filler material (5) is placed around the pin (2a) of the metal component (2) in the vacuum chamber (9). A hollow member (3) having a flange (3a) at one end is inserted around the pin (2a) of the metal component (2) and is placed over the first portion of braze filler material (5). The second portion of braze filler material (6) is placed around the hollow member (3) which seats onto the flange (3a) of the hollow member (3). The ceramic member (4) is placed around the hollow member (3) which seats onto the flange (3a) of the hollow member (3). A third portion of braze filler material (7) placed around the pin (2a) of the metal component (2) is placed onto the top surface of the hollow member (3). The entire multi layered braze joint after undergoing the brazing process forms a leak proof joint. This ceramic-metal joint forms a feed through between the vacuum and atmospheric chamber used in devices like an X-ray tube.

Figure 3:
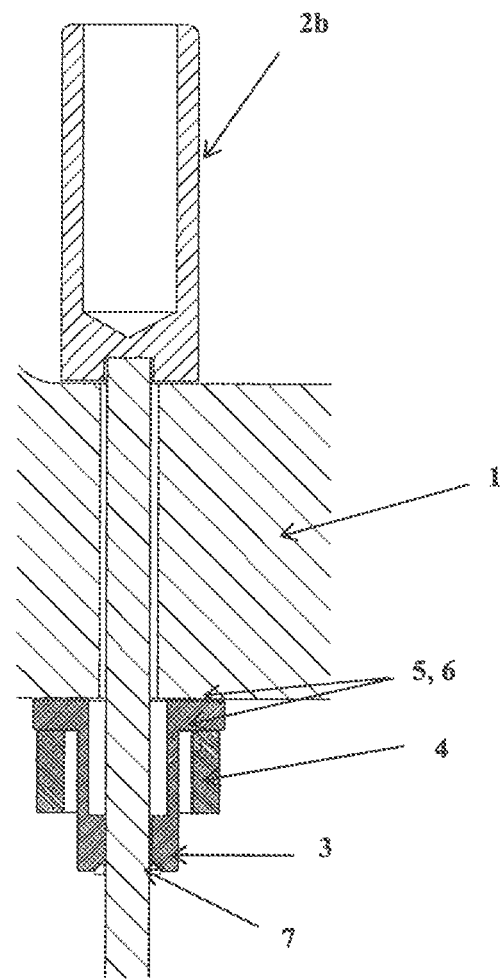
FIG. 3 illustrates a sectional view of the complete assembly of the feed through assembly according to an embodiment of the invention.

FIG. 3 is an exemplary embodiment which illustrates a sectional view of complete assembly of the feed through. The hollow member (3) having a flange (3a) at one end forms a hat shaped structure as shown in the figure. A metal component (2) having a pin (2a) at one end and a hollow metal portion (2b) at the other end. A ceramic member (4) placed around the hollow member (3) seats onto the flange (3a) of the hollow member. The first/second/third portion of braze filler materials (5,6,7) are placed at appropriate positions and are subjected to brazing process, wherein the brazing processes melt the filler materials and fill in the gap between the multilayered joint to form a brazed joint between the metal component (2) and the ceramic insulator (1).

An ideal braze joint depends upon the appropriate metal chosen to join a ceramic to a metal, its dimension, tolerance, braze material and process of brazing all of which play a vital role in obtaining a good ceramic-metal joint.

Thus embodiments of the present invention provide a feed through assembly for medical devices having a leak proof joint between the vacuum and atmospheric chamber. The brazed joint provides a degree of flexibility to take up the loads and also resist the thermal cycles. Also it resists temperatures ranging from about room temperature to about 550° C.

In an embodiment of the disclosure, a cavity (8) is created around the metal component (2) wherein the multi layered joint is inserted.

In an embodiment of the disclosure, the hollow member (3) comprising a flange (3a) at one end forms a hat shaped structure.

In an embodiment of the disclosure, the hollow member (3) may have a stepped inner circumference.

In an embodiment of the disclosure the brazing process melts the braze filler materials (5, 6, 7) to fill gaps in the multilayered joint.

In an embodiment of the disclosure, the metal component (2) material is selected from a group comprising Nickel and Fe—Ni alloy having a chemical composition of 29% Nickel, 17% Cobalt, 53.58% (Balance) Iron, 0.10% Silicon, 0.30% Manganese and 0.02% Carbon.

In an embodiment of the disclosure, the braze filler material (5, 6, 7) is selected from a group comprising Copper Silver (CuSil) alloy having a chemical composition of 72% Silver and 28% Copper and Oxygen-free High Thermal Conductivity Copper (OHFC).

In an embodiment of the disclosure the hollow member (3) material is selected from a group comprising Fe—Ni alloy having a chemical composition of 29% Nickel, 17% Cobalt, 53.58% (Balance) Iron, 0.10% Silicon, 0.30% Manganese and 0.02% Carbon.

In an embodiment of the disclosure, the ceramic member (4) material is selected from a group comprising alumina ceramics with a minimum 94% of Alumina ($Al_2O_3$).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A feed-through assembly, comprising;
    a metal component passed through a ceramic insulator; and
    a multi-layered joint comprising:
        a hollow member of predetermined shape placed around the metal component, the hollow member comprising a flange at a first end;
        a first portion of braze filler material placed around the metal component between the ceramic insulator and the flange, wherein the flange rests on the first portion of braze filler material;
        a second portion of braze filler material placed around the hollow member and seated onto the flange;
        a ceramic member of predetermined shape placed around the hollow member which rests on the second portion of braze filler material; and
        a third portion of braze filler material placed around the metal component and seated onto a second end of the hollow member to form a multi-layered joint;
    wherein the multi layered joint is brazed to the ceramic insulator and the metal component to form a feed-through assembly.

2. The device as claimed in claim 1, further comprising a cavity formed around the metal component to house the multi-layered joint.

3. The device as claimed in claim 1, wherein the first end of the hollow member is the bottom of the hollow member, and wherein the hollow member and the flange at the bottom of the hollow member form a hat shaped structure.

4. The device as claimed in claim 1, wherein the braze filler materials are melted by a brazing process to fill gaps in the multi-layered joint.

5. The device as claimed in claim 1, wherein the metal component comprises a material selected from a group consisting of nickel and a Fe—Ni alloy having a chemical composition of 29% Nickel, 17% Cobalt, 53.58% (Balance) Iron, 0.10% Silicon, 0.30% Manganese and 0.02% Carbon.

6. The device as claimed in claim 1, wherein the braze filler material is selected from a group consisting of a Copper Silver (CuSil) alloy having a chemical composition of 72% Silver and 28% Copper, and oxygen-free high thermal conductivity copper (OHFC).

7. The device as claimed in claim 1, wherein the hollow member comprises a material selected from a group comprises an Fe—Ni alloy having a chemical composition of 29% Nickel, 17% Cobalt, 53.58% (Balance) Iron, 0.10% Silicon, 0.30% Manganese and 0.02% Carbon.

8. The device as claimed in claim 1, wherein the ceramic member comprises alumina ceramics with a minimum 94% of Alumina ($Al_2O_3$).

9. The device as claimed in claim 8, wherein a first end of the metal component comprises a pin and a second end comprises a hollow metal portion.

10. A method of forming a brazed joint between a ceramic insulator and a metal component, the method comprising:
    passing the metal component through the ceramic insulator;

forming a multi-layered joint by:
- placing a first portion of braze filler material around the metal component to rest on the ceramic insulator;
- inserting a hollow member having a flange at a first end over the first portion of braze filler material, wherein the flange seats onto the first portion of braze filler material;
- placing a second portion of braze filler material around the hollow member, wherein the second portion of braze filler material rests on the flange of the hollow member;
- inserting a ceramic member around the hollow member, wherein the ceramic member rests on the second portion of braze filler material, and
- inserting a third portion of braze filler material around the metal component, such that the third portion of braze filler material rests on a second end of the hollow member to form the multi-layered joint; and subjecting the multi-layered joint to predetermined number of brazing temperature cycles to form the brazed joint between the ceramic insulator and the metal component.

11. The method as claimed in claim 10, further comprising forming a cavity around the metal component to house the multi-layered joint.

* * * * *